United States Patent [19]

Konstantinov et al.

[11] 4,324,667

[45] Apr. 13, 1982

[54] PROCESS FOR PURIFICATION OF WASTE WATERS FROM AROMATIC AMINES

[76] Inventors: Igor I. Konstantinov, prospekt Lenina, 101, kv. 12; Antonina I. Kormushechkina, ulitsa Pirogova, 1/2, kv. 26; Jury A. Avdonin, prospekt Tsiolkovskogo, 31, kv. 52; Vladimir M. Kotlyarsky, prospekt Pobedy, 3, kv. 34; Albert A. Kim, ulitsa Griboedova, 33, kv. 22; Nikolai V. Obraztsov, ulitsa Kljukvina, 8, kv. 24; Alexei V. Efimov, prospekt Lenina, 85, kv. 43, all of Dzerzhinsk, U.S.S.R.

[21] Appl. No.: 198,208

[22] PCT Filed: Feb. 23, 1979

[86] PCT No.: PCT/SU79/00010

§ 371 Date: Oct. 17, 1980

§ 102(e) Date: Oct. 17, 1980

[87] PCT Pub. No.: WO80/01800

PCT Pub. Date: Sep. 4, 1980

[51] Int. Cl.³ .............................................. C02F 1/54
[52] U.S. Cl. ..................................... 210/729; 210/903
[58] Field of Search ............... 210/692, 729, 735, 725, 210/727, 728, 737, 903

[56] References Cited

U.S. PATENT DOCUMENTS 3,144,474  8/1964  Kantyka et al. .................... 210/729

FOREIGN PATENT DOCUMENTS 2558040   6/1977  Fed. Rep. of Germany ...... 210/728
49-113766 10/1974 Japan ................................... 210/729

OTHER PUBLICATIONS

Sugh A. et al., Chem. Pharm. Bull., vol. 27, No. 4, pp. 1042–1044, (Apr. 1979).
Chem. Abstracts, vol. 92:163689v, "Recovery of Amines".

Primary Examiner—Benoit Castel
Attorney, Agent, or Firm—Lilling & Greenspan

[57] ABSTRACT

The present invention relates to chemical processes for purification of industrial waste waters from aromatic amines.

The process of the invention is characterized in that into waste waters aromatic di- or polyisocyanates are introduced in a molar ratio with aromatic amines ranging from 1:1 to 30:1 respectively. The resulting precipitate is separated from the purified waste waters. The aromatic isocyanates can be introduced into waste waters as solutions in inert organic solvents.

The process of this invention can be useful in processes for the production of aromatic amines and derivatives thereof, for example aromatic isocyanates.

3 Claims, No Drawings

PROCESS FOR PURIFICATION OF WASTE WATERS FROM AROMATIC AMINES

FIELD OF THE INVENTION

The present invention relates to chemical processes for purification of industrial waste waters from aromatic amines.

BACKGROUND OF THE INVENTION

Known in the art are adsorptional, extractive and chemical processes for purification of waste waters from contaminating aromatic amines (cf. E. A. Andrievskaja in Coll. "Purification of Chemical Waste Waters", issue 12/62, Moscow, 1974, p. 52–53).

Adsorption and extraction processes feature considerable power consumption, multi-stage character and complexity of the processes of regeneration of the adsorbents and extraction agents.

Among the prior art chemical processes for purification of waste waters the most effective are those based on binding aromatic amines with formaldehyde with the formation of precipitates of solid products which are then separated from purified waste waters (cf. the Andrievskaja supra; USSR Inventor's Certificate No. 137836; Coll. "Synthesis and Study of Effectiveness of Chemicals—Additives to Polymeric Materials", issue 2, "Tambovskaja Pravda" Publishing House, 1969, p. 756–758).

These prior art processes feature a relatively low degree of purification and make it possible to lower the content of aromatic amines in waste waters from 3–7 to 0.1 g/l.

SUMMARY OF THE INVENTION

The present invention is directed to, in a process for purifying of waste waters from aromatic amines in the presence of agents reacting with amines to form solid products as precipitates, agents which make it possible to substantially increase the degree of purification.

This object is accomplished by adding, to the waste waters being purified, agents reacting with amines to form precipitates of solid products, followed by separation of the precipitates from the purified waste waters, wherein in accordance with the present invention the above-mentioned agents are aromatic mono- or polyisocyanates in a molar ratio to aromatic amines ranging from 1:1 to 30:1 respectively.

It has been found that the addition of aromatic isocyanates, to waste waters containing aromatic amines (aniline, 3,4-dichloraniline, 3-chloro-4-methylaniline, diphenylmethanediamine-4,4', tolylenediamine-2,4, a mixture of polyphenylpolymethylenepolyamines and the like), makes it possible to reduce the content of aromatic amines in waste waters from concentrations of the order of thousands mg/l down to concentrations of the order of dozens or units mg/l. The purification can be used with waste waters containing no other impurities (in addition to amines) and waste waters containing, for example impurities of mineral salts, mineral oils, aliphatic alcohols, ammonia and other products, provided that methods of purification from these impurities are known.

The process according to the present invention is simple in terms of its scheme and the equipment employed.

The aromatic isocyanates in the present invention can be, for example, phenyl-isocyanate, 3-chloro-4-methylphenylisocyanate, 3,3'-dimethyldiphenylmethanediisocyanate-4,4'; 3,5-dibromotolylenediisocyanate-2,4; diphenylmethanediisocyanate-4,4'; tolylenediisocyanate-2,4; a mixture of isomers of diphenylmethanediisocyanate consisting of 4,4'-isomer, 2-4'-isomer and 2,2'-isomer, a mixture of polyphenylpolymethylenepolyisocyanates, and the like.

An additional technique making it possible to lower the residual concentration of amines to decimal fractions of mg/l (the value close to the threshold of sensitivity of the employed analytical methods) is the introduction of aromatic isocyanates into waste waters as solutions in inert organic solvents.

The inert organic solvents in the present invention can be for example, chlorobenzene, benzene, toluene, kerosene and the like.

The Best Mode for Carrying-Out the Invention

The process according to the present invention is based on one of the quickest reactions of aromatic isocyanates:

$$RNH_2 + RNCO \rightarrow RNHCONHR \qquad (I)$$

The resulting urea derivatives of the formula RNHCONHR wherein R is an aromatic radical are substantially insoluble in water. These derivatives of urea after their separation as precipitates from waste waters can be utilized, for example, for the production of heat-resistant lubricants, for the production of aromatic amines and isocyanates, while the purified waste waters are delivered to the production for a repeated use.

A side reaction is hydrolysis of aromatic isocyanates occurring at a substantially lower rate than the reaction between isocyanates and amines. The hydrolysis reaction corresponds to the following scheme:

$$RNCO + H_2O \rightarrow RNHCOOH \rightarrow RNH_2 + CO_2 \qquad (II)$$

The aromatic amines resulting from the reaction (II) are reacted with an excess of isocyanates forming urea derivatives insoluble in water. Therefore, the entire amount of isocyanate introduced into the waste waters is consumed to form insoluble products thus avoiding the possibility of contaminating of waste waters with isocyanates.

The urea derivatives formed, as mentioned hereinbefore, as a result of the interaction of aromatic isocyanates with aromatic amines are separated as precipitates from the purified waste waters by conventional methods such as settling, and filtration. As a result of the use of inert organic solvents, the precipitates formed along with organic solvents are separated from the purified waste waters, whereafter the solvents are distilled-off from said precipitates.

For a better understanding of the present invention, some specific examples are given hereinbelow by way of illustration.

EXAMPLE 1

To two portions (by 200 ml) of waste water containing 2,000 mg/l of aniline there are added: to the first portion—20 ml of a 5% solution of phenylisocyanate in chlorobenzene, to the second portion—20 ml of chlorobenzene (for comparison). The solutions are intermixed at the temperature of 20°C for two hours, samples of the aqueous layer are taken, filtered, analyzed for the content of aniline by the photocolorimetric method with para-(dimethylamino)-benzaldehyde. The content of aniline in the first sample is 62 mg/l, in the second one—750 mg/l.

EXAMPLE 2

To 200 ml of waste water containing 190 mg/l of 3,4-dichloroaniline there are added 5 ml of a 4% solution of diphenylmethanediisocyanate-4,4' in chlorobenzene. The resulting mixture is stirred at a temperature of 90° C. for 1.5 hours, and sample is taken from the aqueous layer and filtered. The content of 3,4-dichloroaniline in the aqueous layer is 1.6 mg/l.

EXAMPLE 3

To 200 ml of waste water containing 400 mg/l of 3-chloro-4-methylaniline there are added 5 ml of a 4% solution of 3-chloro-4-methylphenylisocyanate in benzene. The resulting mixture is stirred for 2 hours at the temperature of 15°C, a sample of the aqueous layer is taken and filtered. The content of 3-chloro-4-methylaniline in the aqueous layer is 10 mg/l.

EXAMPLE 4

To 200 ml of waste water containing 2,000 mg/l of aniline there are added 10 ml of a 15% solution of diphenylmethanediisocyanate-4,4' in kerosene. The resulting mixture is stirred at a temperature of 15° C. for 4 hours, and a sample of the aqueous layer is taken and filtered. The content of aniline in the aqueous layer is 37 mg/l.

EXAMPLE 5

To 200 ml of waste water containing 1,850 mg/l of aniline there are added 10 ml of a 20% chlorobenzene solution of a mixture of polyphenylpolymethylenepolyisocyanates containing 30% of NCO-groups and prepared by phosgenation of the products of condensation of aniline with formaldehyde. The resulting mixture is stirred for 30 minutes at a temperature of from 45° to 50° C., and a sample of the aqueous layer is taken and filtered. The content of aniline in the aqueous layer is 0.6 mg/l.

EXAMPLE 6

To 200 ml of waste water containing 1,850 mg/l of aniline there are added 20 ml of a 20% solution of diphenylmethane-diisocyanate-4,4' in chlorobenzene. The resulting mixture is stirred for 30 minutes at a temperature of 45° C., and a sample is taken from the aqueous layer and filtered. The content of aniline in the aqueous layer is 0.4 mg/l.

EXAMPLE 7

To 200 ml of waste water containing 1,400 mg/l of aniline, 1,400 mg/l of ethanol, 200 mg/l of ammonium hydroxide, 50,000 mg/l of sodium chloride, 2,000 mg/l of sodium carbonate there are added 20 ml of a 10% solution of diphenylmethanediisocyanate-4,4' in chlorobenzene. The resulting mixture is stirred for 3 hours at a temperature of 50° C., and a sample of the aqueous layer is taken and filtered. The content of aniline in the aqueous layer is 0.7 mg/l.

EXAMPLE 8

To 200 ml of waste water containing 190 mg/l of diphenylmethanediamine-4,4' there are added 4 ml of a 3.8% solution of diphenylmethanediisocyanate-4,4'-in toluene. The resulting mixture is stirred for two hours at a temperature of from 45° to 50° C., and a sample of the aqueous layer is taken and filtered. The content of diphenylmethanediamine-4,4' in the aqueous layer is 0.8 mg/l.

EXAMPLE 9

To 200 ml of waste water containing 2,000 mg/l of tolylenediamine-2,4 there are added 10 ml of a 18% solution of tolylenediisocyanate-2,4 in chlorobenzene. The resulting mixture is stirred at a temperature of 45° to 50° C. for two hours, a sample of the aqueous layer is taken and filtered. The content of tolylenediamine-2,4 in the aqueous layer is 2.3 mg/l.

EXAMPLE 10

To 200 ml of waste water containing 1,230 mg/l of a mixture of polyphenylpolymethylenepolyamines (the mixture contains 15.% of $NH_2$-groups and is obtained by condensation of aniline with formaldehyde), there are added 2 g of a mixture of polyphenylpolymethylenepolyisocyanates containing 28.5% of NCO-groups. The resulting mixture is stirred for 2 hours at a temperature of from 45° to 50° C., and a sample is taken from the aqueous layer and filtered. The content of the mixture of polyphenylpolymethylenepolyamines in the aqueous layer is 30 mg/l.

EXAMPLE 11

To 200 ml of waste water containing 190 mg/l of diphenylmethanediamine-4,4' there is added 1.5 g of diphenylmethanediisocyanate-4,4'. The resulting mixture is stirred at a temperature of 45°–50° C. for 2 hours, and a sample of the aqueous layer is taken and filtered. The content of diphenylmethanediamine-4,4' in the aqueous layer is 4 mg/l.

EXAMPLE 12

To 1,000 l of waste water containing aniline and a mixture of polyphenylpolymethylenepolyamines in the amount of 5,600 mg/l (calculated for aniline), methanol-128,000 mg/l sodium chloride 168,500 mg/l there are added 50 kg of a 20% solution, in chlorobenzene, of a mixture of polyphenylpolymethylenepolyisocyanates, containing 30.5% of NCO-groups. The resulting mixture is stirred at a temperature of 60° C. for 2.5 hours, and a sample is taken from the aqueous layer and filtered. The content of amines in the aqueous layer, as calculated for aniline, is 32 mg/l.

EXAMPLE 13

To 200 ml of waste water containing 2,000 mg/l of tolylenediamine-2,4 there are added 10 ml of a 15% solution of a mixture of isomers of diphenylmethanediisocyanate (the content of isomers is the following, % by mass: 4,4'-isomer-64.9; 2,4'-isomer-30; 2,2'-isomer-5.1) in chlorobenzene. The resulting mixture is stirred at a temperature of 45° to 50° C. for 2 hours, and a sample of the aqueous layer is taken and filtered. The content of tolylenediamine-2,4 in the aqueous layer is 2.3 mg/l.

EXAMPLE 14

To 200 ml of waste water containing 610 mg/l of aniline there are added 5 ml of a 14% solution of 3,5-dibromotolylenediisocyanate-2,4 in chlorobenzene. The resulting mixture is stirred at a temperature of 16° C. for 4 hours, a sample of the aqueous layer is taken and filtered. The content of aniline in the aqueous layer is 5 mg/l.

EXAMPLE 15

To 200 ml of waste water containing 570 mg/l of tolylenediamine-2,4 there are added 10 ml of a 10% solution of 3,3'-dimethyldiphenylmethanediisocyanate-4,4'-in chlorobenzene. The resulting mixture is stirred at a temperature of 45° to 50° C. for three hours, a sample is taken from the aqueous layer and filtered. The content of tolylenediamine-2,4 in the aqueous layer is 62 mg/l.

Industrial Applicability

The process for purification of waste waters from aromatic amines can be useful in the processes for the production of aromatic amines and derivatives thereof such as aromatic isocyanates.

We claim:

1. A process for purifying waste waters containing aromatic amines, comprising adding, to said waste waters, an amine precipitating agent selected from the group consisting of 3,3'-dimethyldiphenylmethanediisocyanate-4,4'; 3.5-dibromotolylenediisocyanate-2,4; diphenylmethanediisocyanate-4,4'; tolylenediisocyanate-2,4; a mixture of isomers of diphenylmethanediisocyanate consisting of 4,4'-isomer, 2,4'-isomer and 2,2'-isomer, or a mixture of polyphenyl-polymethylene-polyisocyanates, in a molar ratio to said aromatic amines ranging from 1:1 to 30:1, respectively; wherein said amine precipating agent is introduced into said waste waters as a solution in an inert organic solvent, and separating the precipitate thereby formed from the waste waters.

2. A process according to claim 1, wherein the amine precipitating agent is selected from the group consisting of 3,3'-dimethyldiphenylmethanediisocyanate-4,4'; 3.5-dibromotolylenediisocyanate-2,4; diphenylmethanediisocyanate-4,4', tolylenediisocyanate-2,4.

3. A process according to any of claims 1 or 2, wherein the inert organic solvents are selected from the group consisting of chlorobenzene, benzene, toluene or kerosene.

* * * * *